(12) United States Patent
Feldcamp

(10) Patent No.: US 7,100,732 B2
(45) Date of Patent: Sep. 5, 2006

(54) POSITIVE TRACTION HYDRAULIC DRIVE SYSTEM

(75) Inventor: Larry E. Feldcamp, Callender (CA)

(73) Assignee: Parker-Hannifin Corporation, Cleveland, OH (US)

( * ) Notice: Subject to any disclaimer, the term of this patent is extended or adjusted under 35 U.S.C. 154(b) by 209 days.

(21) Appl. No.: 10/640,521

(22) Filed: Aug. 13, 2003

(65) Prior Publication Data

US 2004/0040774 A1  Mar. 4, 2004

Related U.S. Application Data

(60) Provisional application No. 60/408,505, filed on Sep. 4, 2002.

(51) Int. Cl.
    *B60K 17/00* (2006.01)
(52) U.S. Cl. .................. 180/305; 180/308; 60/701
(58) Field of Classification Search ............... 180/305, 180/306, 307, 308, 367, 6.3; 60/701
See application file for complete search history.

(56) References Cited

U.S. PATENT DOCUMENTS

| 3,149,464 | A | | 9/1964 | Fauchere |
| 3,175,570 | A | * | 3/1965 | Fernand et al. ............ 137/101 |
| 3,978,937 | A | | 9/1976 | Chichester et al. |
| 4,413,698 | A | * | 11/1983 | Conrad et al. ............. 180/305 |
| 4,457,387 | A | | 7/1984 | Taylor |
| 5,137,100 | A | | 8/1992 | Scott et al. |
| 5,181,579 | A | | 1/1993 | Gilliem |
| 5,191,950 | A | * | 3/1993 | Kleineisel et al. ........... 180/6.3 |
| 5,282,516 | A | * | 2/1994 | Price ......................... 180/6.3 |
| 5,810,106 | A | * | 9/1998 | McCoy ....................... 180/243 |
| 6,230,829 | B1 | * | 5/2001 | Martin et al. ................ 180/6.3 |
| 6,354,392 | B1 | * | 3/2002 | Cousin et al. .............. 180/242 |
| 6,446,774 | B1 | * | 9/2002 | Porter ......................... 192/35 |
| 6,488,111 | B1 | * | 12/2002 | McKenna et al. .......... 180/308 |
| 6,604,601 | B1 | * | 8/2003 | Steele ......................... 180/307 |
| 6,843,340 | B1 | * | 1/2005 | Miller ......................... 180/308 |

* cited by examiner

*Primary Examiner*—Christopher P. Ellis
*Assistant Examiner*—Brian Swenson
(74) *Attorney, Agent, or Firm*—Christopher H. Hunter

(57) ABSTRACT

A hydraulic drive system includes a pair of hydraulic drive motors connected in series. Each motor includes a hydraulic circuit with a spring-biased directional control valve and a pair of check valves. The circuits are located in the end cover for each motor, and are in fluid communication with the respective motor and with each other. The circuits are responsive to the pressure differential across the motors, due to the load and direction of the vehicle, and direct flow to one wheel or the other. Flow is directed to the inside motor when accelerating and/or climbing, while the outside motor is allowed to turn freely to compensate for the different turning radius. This reverses when the vehicle is going downhill and/or decelerating, when the motors are braking. If the drive wheel loses traction, the flow and pressure shifts to the other wheel (or to both wheels), until traction is regained.

11 Claims, 11 Drawing Sheets

POSITIVE TRACTION HYDRAULIC DRIVE SYSTEM

CROSS-REFERENCE TO RELATED CASES

The present application claims the benefit of the filing date of U.S. Provisional Application Ser. No. 60/408,505; filed Sep. 4, 2002, the disclosure of which is expressly incorporated herein by reference.

BACKGROUND OF THE INVENTION

The present invention relates generally to hydraulic drive systems for vehicles.

In certain vehicles, a hydraulic system is used to move the vehicle. When the vehicle turns left or right, the turning wheels rotate at different speeds because of the turning radius of the vehicle. If the hydraulic system is connected to provide power to the turning wheels, the system must compensate for this differential, to maintain power and traction to the vehicle. The system must also compensate for different loads, and whether the vehicle is on an upgrade or downgrade, as well as when one wheel loses traction.

A number of hydraulic drive systems have been developed in an attempt to power the vehicle under different loads and when the vehicle is turning.

Some systems use motors connected in parallel, that is, a single input is provided which is then split off to the right and left motors. Flow divider/combiner units or other types of control valves are used to control the flow rates to the motors, in proportion to the steer angle. See, e.g., U.S. Pat. Nos. 3,149,464; 3,978,937; and 5,181,579. While such systems may be appropriate for certain applications, the parallel plumbing of the systems adds complexity and cost to the hydraulic drive system. In certain applications, the space available for the hydraulic circuit and motors is at a premium, and it is incumbent to keep the components as compact as possible. It is believed at least some of such prior devices fail in this respect.

It is therefore believed there is a demand in the industry for a hydraulic drive system for a vehicle which compensates for the load and direction of the vehicle, so that power is maintained to the vehicle in different directions, under different loads, and even when a drive wheel loses traction, and where the system is simple, efficient and compact.

SUMMARY OF THE INVENTION

The present invention provides a novel and unique hydraulic drive system for a vehicle which compensates for the load and direction of the vehicle, so that power is maintained to the vehicle in different directions, under different loads, and even when a drive wheel loses traction. The system is simple, efficient and compact.

According to the principles of the present invention, the system includes at least two hydraulic drive motors, with each motor having a drive mechanism operatively connected to a drive shaft driving a wheel of the vehicle. Each motor includes an inlet port and an outlet port for directing fluid to and from the drive mechanism. The motors are connected in series, with the outlet port of one motor fluidly connected to the inlet port of the other.

A hydraulic circuit is located in an end cover for each motor. Each hydraulic circuit includes a spring-biased directional control valve and a pair of check valves. The hydraulic circuit is in fluid communication with its respective drive mechanism, and also with the other circuit. The directional control valves are responsive to the pressure differential across the motors, due to the load and direction of the vehicle, and direct flow to one wheel or the other. For driving purposes, while accelerating and/or climbing uphill, the required torque is transmitted by the flow and pressure passing through the motor turning the wheel on the inside turning radius, while the outside motor is allowed to turn freely and faster by re-circulating the required flow to compensate for the different turning radius of the vehicle.

This process reverses when the vehicle is going downhill and/or decelerating, and the motors are braking. The required torque is then transmitted by the flow and pressure passing through the motor turning the wheel on the outside turning radius, while the motor turning the wheel on the inside turning radius is allowed to turn freely and slower by re-circulating the required flow to compensate for the different turning radius of the vehicle. If a drive wheel loses traction, the flow and pressure is automatically shifted to the other wheel and/or both wheels, until traction is regained.

The same flow is provided to both motors and the pressure is divided evenly by the motors when the vehicle is traveling in a straight line.

A conventional brake release path is typically provided for each wheel A cross-over relief valve can also be provided for the hydraulic circuits, if necessary or desirable.

As such, the present invention provides a simple, efficient and compact hydraulic drive system for a vehicle which compensates for the load and direction of the vehicle, so that power is maintained to the wheels of the vehicle when the vehicle is traveling in different directions, under different loads, and even when a drive wheel loses traction.

Further features of the present invention will become apparent to those skilled in the art upon reviewing the following specification and attached drawings.

DETAILED DESCRIPTION OF THE PREFERRED EMBODIMENT

Figure 1:
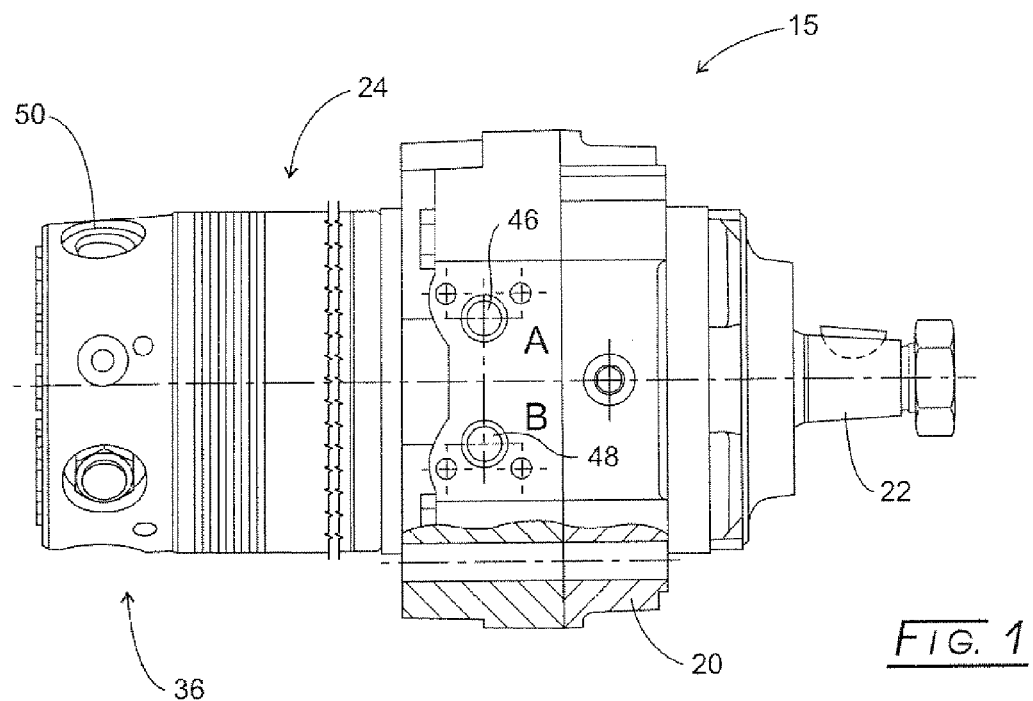
FIG. 1 is a side view of a hydraulic motor constructed according to the principles of the present invention.
Figure 2:
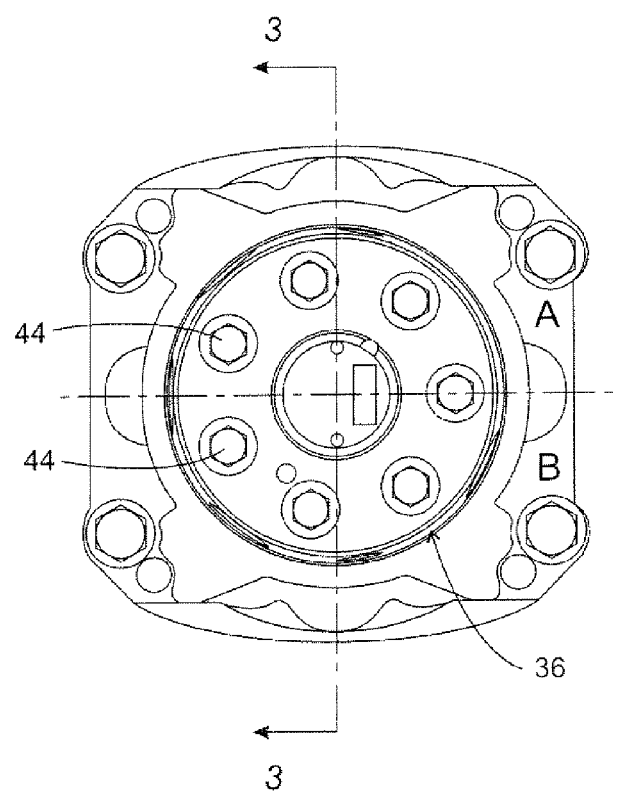
FIG. 2 is an end view of the motor of FIG. 1, taken from the left side of FIG. 1.
Figure 3:
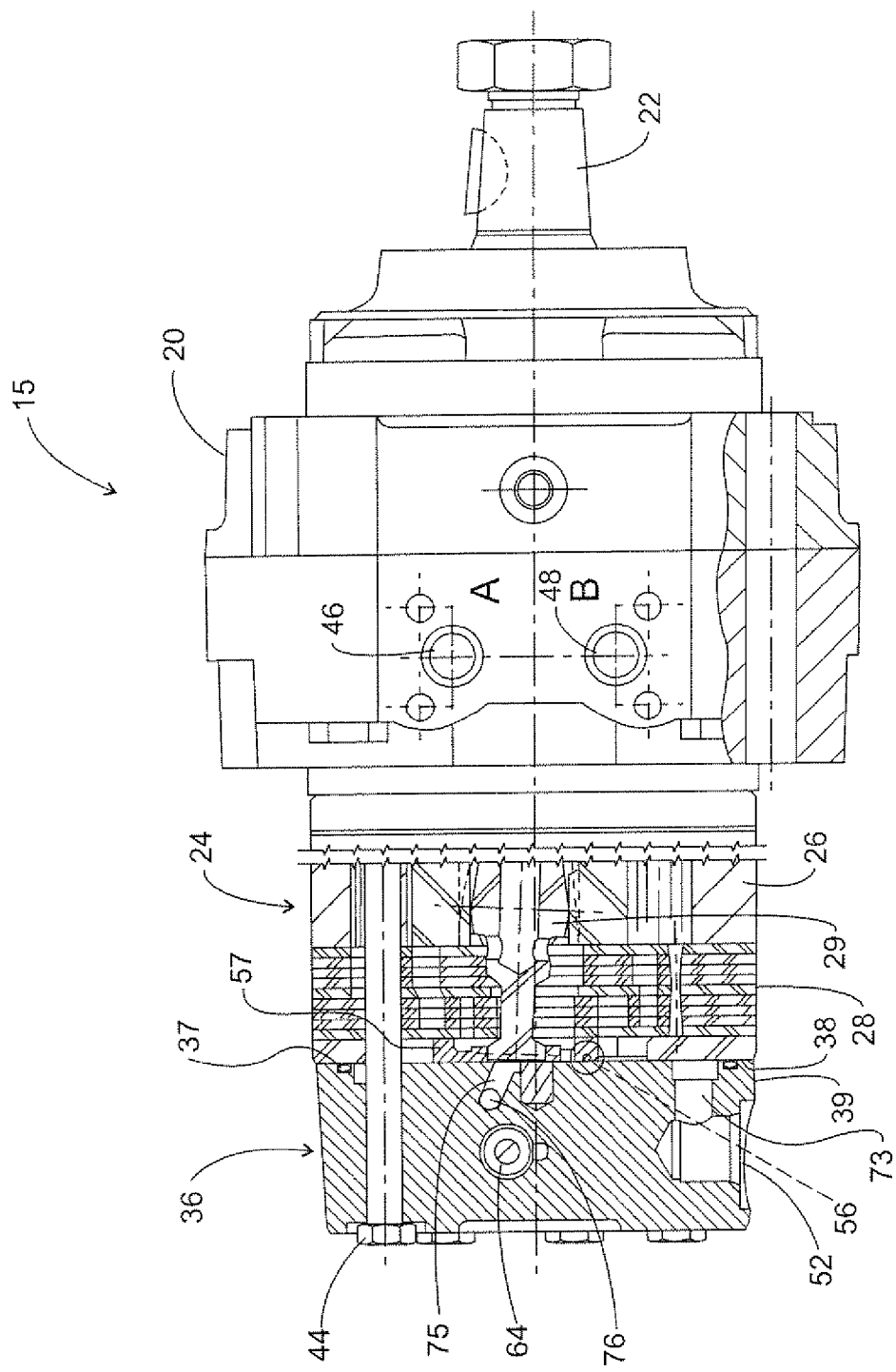
FIG. 3 is a side view the motor, with a portion shown in cross-section taken substantially along the plane described by the lines 3—3 in FIG. 2.
Figure 4:
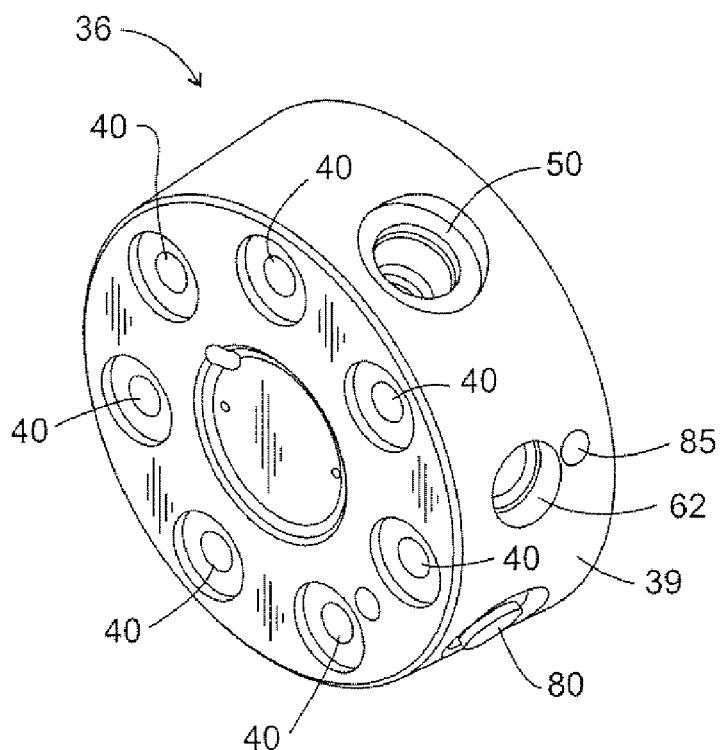
FIG. 4 is an elevated perspective view of the end cover for the motor.
Figure 6:
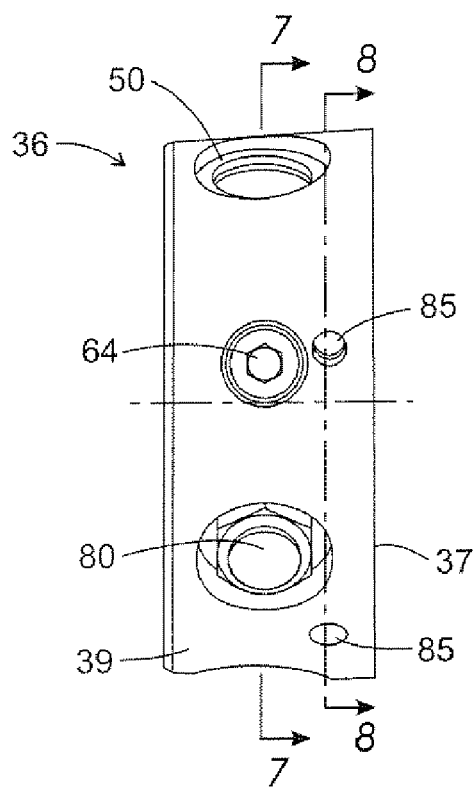
FIG. 6 is a side view of the end cover.
Figure 8:
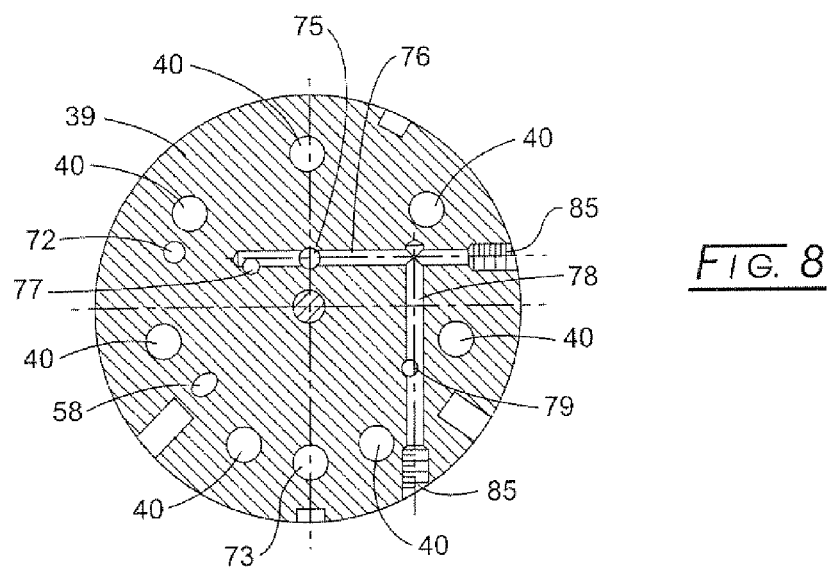
FIG. 8 is a cross-sectional end view of the end cover taken substantially along the plane described by the lines 8—8 in FIG. 6.
Figure 5:
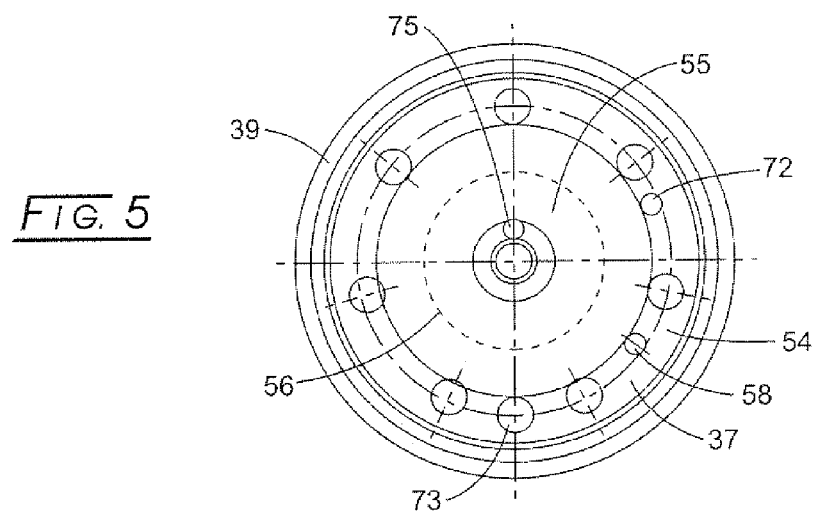
FIG. 5 is a front end view of the end cover.

Referring to the drawings, and initially to FIGS. 1–9, a hydraulic motor constructed according to the principles of the present invention is indicated generally at 15. As will be described in more detail below, the motor 15 is particularly adapted to be incorporated into a hydraulic drive system for a vehicle, to power the vehicle under different load conditions and directions.

The motor 15 includes a housing 20 with a rotatable drive shaft 22 projecting out of one end of the housing. Drive shaft 22 is connected to a wheel of the vehicle in any appropriate manner to rotate the wheel when the drive shaft rotates. The motor 15 also has a drive mechanism appropriate for the particular application. A gerotor-type drive mechanism is illustrated generally at 24 in FIG. 3, and includes a rotor and stator combination 26. A multiple-plate manifold 28 directs flow into and out of the teeth defined between the rotor and stator, as should be well-known to those skilled in the art. A wobble shaft 29 is illustrated which mechanically connects the drive shaft 22 to the drive mechanism 24.

One gerotor-type of motor useful for the present invention is manufactured by the assignee under the model/designation Parker BG Motor. It is noted that other drive mechanisms could also be used with the present invention, such as axial pistons, radial pistons, bent pistons, external gears, vanes, etc. The drive mechanism could also be external to the motor.

A hydraulic drive circuit, to be described more fully below, is provided adjacent manifold 28, in fluid communication with the drive mechanism. The drive circuit is located in an end cover assembly, indicated generally at 36. End cover assembly 36 has a front, flat mounting face 37, and is located flush against an opposing front, flat end wall 38 of the housing. The end cover assembly 36 includes a cylindrical body 39, with a series of axial through-holes 40 formed therethrough. Through-holes 40 enable the end cover assembly to be easily attached to (and removed from) the motor housing 20 using a series of appropriate fasteners, such as bolts 44.

A first "A1" port 46 and a second "B" port 48 are formed in the housing 20 of the motor to direct flow into and out of the drive mechanism. A third "C" port 50 is provided in the end cover assembly 36, along with a fourth "A2" port 52. A1 port 46 and A2 port 52 are fluidly interconnected through the motor, and as such, A2 is essentially a redundant A1 port.

Referring now primarily to FIGS. 4–9, the face 37 of the end cover assembly is divided into two zones, a first, radially outer zone 54 in fluid communication with A1 port 46; and a second, radially inner zone 55 in fluid communication with B port 48. The zones are separately connected to the teeth of the gerotor, and respectively receive either a high-pressure fluid flow from the drive mechanism, or direct a low-pressure fluid flow to the drive mechanism, depending upon the rotation of the drive mechanism and whether the drive mechanism is acting as a motor or brake (i.e., acting on a positive or negative load). A seal 56 (FIGS. 3, 5) carried by a valve plate 57 connected to wobble shaft 29 seals against the opposing face 37 of the end cover assembly and fluidly separates the outer zone 54 from the inner zone 55 as the drive shaft/wobble shaft rotates.

Figure 7:
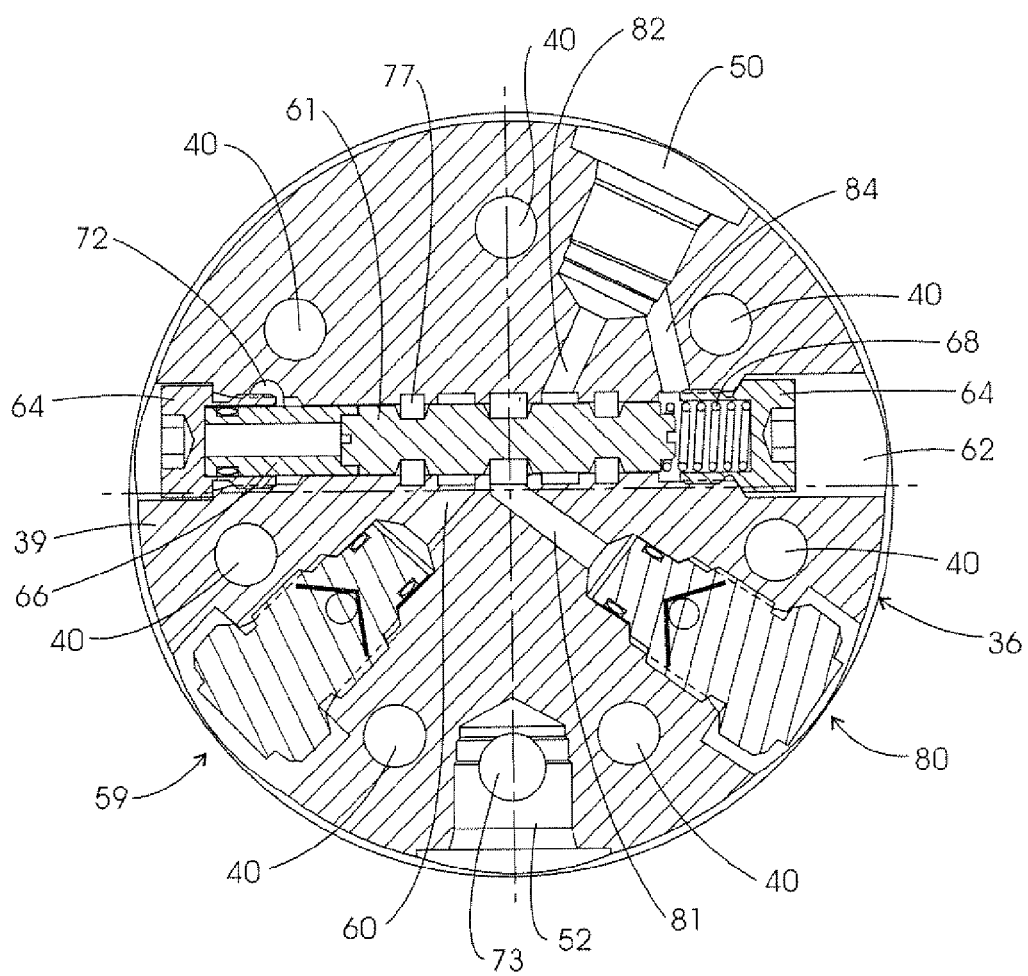
FIG. 7 is a cross-sectional end view of the end cover taken substantially along the plane described by the lines 7—7 in FIG. 6.

The outer zone 54 of face 37 (from A1 port 46) is fluidly connected via passage 58 to a first one-way check valve, indicated generally at 59 in FIG. 7. Check valve 59 is in turn connected via passage 60 to a directional control valve, indicated generally at 61. Directional control valve 61 comprises a spool-type valve slideable in a lateral bore 62 formed through body 39. A pair of plugs 64 retain the spool in the bore, and the spool is biased in one (closed) direction against an annular stop 66 by a spring 68. The outer zone 54 (from A1 port 46) is also connected via line 72 to the end of the spool opposite the spring 68. This provides a pilot signal to this end of the spool from the A1 port.

The outer zone 54 is also in direct fluid communication with A2 port via axial passage 73. Again, as indicated above, A2 is essentially a redundant A1 port.

Figure 9:
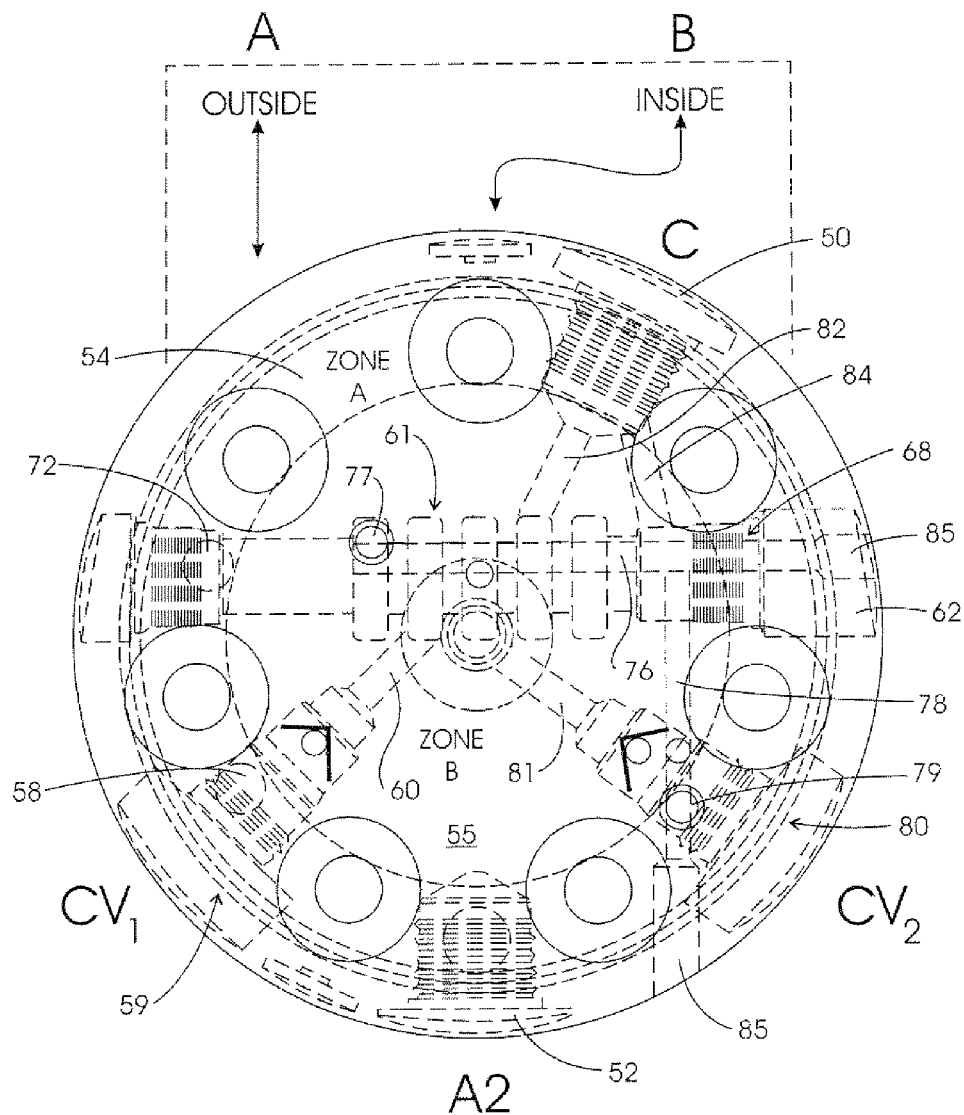
FIG. 9 is an end view of the hydraulic motor, in the direction of the end cover, schematically showing the flow paths through the end cover.

The inner zone 55 of face 37 (from B port 48) is fluidly connected through axial passage 75, lateral passage 76 and then axial passage 77 to directional control valve 61. Axial passage 77 is in fluid communication with passage 60 when the valve is in an open position to fluidly connect the inner zone 55 with the outer zone 54 (through check valve 59); while fluid flow between these passages is blocked when the valve is in its closed position. (FIGS. 7, 9). Check valve 59 allows flow from the inner zone to the outer zone, but blocks flow in the reverse direction, that is, from the outer zone to the inner zone.

Passage 76 from the inner zone 55 is also fluidly connected through a lateral passage 78 and axial passage 79 to a second one-way check valve, indicated generally at 80. Second check valve 80 is in turn connected via passage 81 to directional control valve 61. Passage 81 is fluidly connected to passage 82 leading to C port 50 when the valve is in an open position to fluidly connect the inner zone 55 with the C port; while fluid through these passages is blocked when the valve is in a closed position (FIGS. 7, 9). Check valve 80 allows flow from C port 50 to the inner zone, but blocks flow in the reverse direction, that is, from the inner zone to the C port.

A second pilot signal, from C port 50, is applied via line 84 to the opposite, spring side of the spool.

Passages 76 and 78 are preferably formed by drilling in from the outer periphery of body 39, with plugs 85 inserted into the outer ends of these passages.

The directional control valve 61 is normally in a closed position, with spring 68 forcing the spool 59 against stop 66. In this position, flow between passages 77 and 60; and between passages 82 and 81, is blocked. When the pilot pressure in signal line 72 becomes greater than the force of spring 68 and any pressure applied along signal line 84, the spool moves away from stop 66 to an open position, and flow is allowed between passages 77 and 60; and between passages 82 and 81.

While the directional control valve is described above as a spool-type valve, it should be appreciated that this is only one type of valve appropriate for the particular application, and that other conventional 2-way, 4-port valves and/or "logic element" type hydraulic components could be used in the present invention.

Using a simple hydraulic circuit as described above in conjunction with a hydraulic motor, a hydraulic drive system is created to control the flow applied to move a vehicle under different load conditions and in different directions.

To this end, referring now to FIGS. 10–14, a hydraulic drive system is illustrated generally at 94, for controlling the flow of hydraulic fluid to left and right vehicle wheels 96, 97, respectively. The hydraulic drive system is created by fluidly connecting a pair of hydraulic motors in series, each motor having a hydraulic circuit as described above. Specifically, a hydraulic circuit 98 is associated with right wheel 97; and a hydraulic circuit 99 is associated with left wheel 96. Each hydraulic circuit is preferably identical, to facilitate the manufacture of the hydraulic motor and associated componentry, and a single prime (') will be used to designate the components of circuit 98; while a double-prime (") will be used to designate the components of circuit 99, to facilitate explanation.

A high pressure flow from a fluid source such as a pump (not shown) is provided on inlet line 100, which is fluidly connected to port 46' (the "A1" port) of the hydraulic motor 15'. Port 48 (the "B") port is fluidly connected via line 101 to port 48" (the "B" port) of the hydraulic motor 15" in the other hydraulic circuit 99. Port 46" (the "A1" port) in the hydraulic motor of circuit 99 is fluidly connected to a low pressure outlet line 102 to tank or back to the fluid source. Port 52" (the "A2" port) of the hydraulic circuit 99 is fluidly connected via line 103 to port 50' (the "C" port) of the hydraulic circuit 98; while port 52' (the "A2" port) of hydraulic circuit 98 is fluidly connected via line 104 to port 50" (the "C" port) of hydraulic circuit 99. As should be appreciated, the motors are thereby connected in series, albeit with the ports reversed (i.e., the flow out of a "B" port in the first motor is applied to the "B" port of the second motor).

Figure 10:
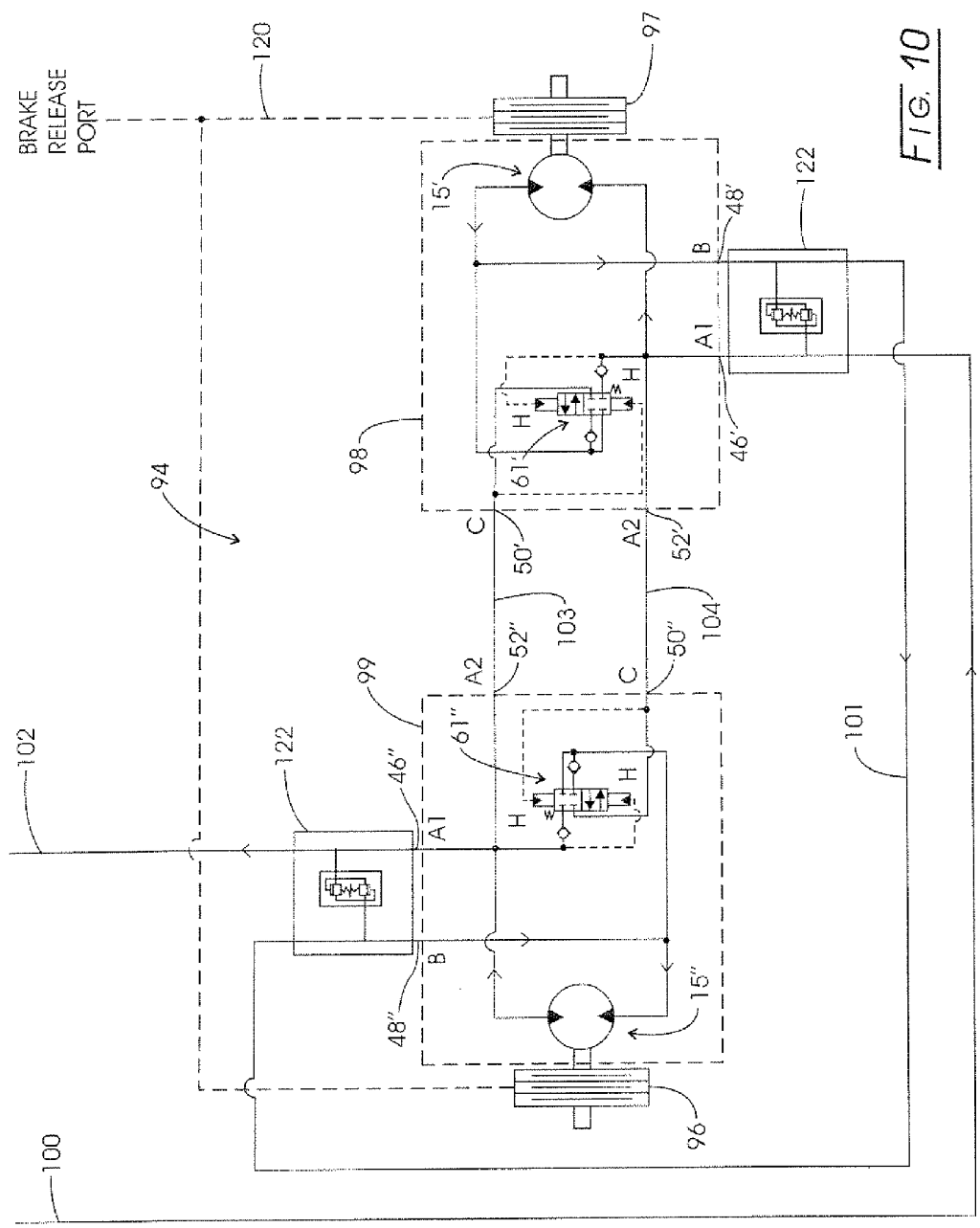
FIG. 10 is a schematic view of a hydraulic drive system for a vehicle incorporating the hydraulic motor of FIG. 1, illustrating the hydraulic drive system operating under a straight, forward, uphill, positive load condition.

FIG. 10 illustrates the condition when the vehicle is traveling in a straight line, either uphill or downhill, and both wheels have sufficient traction. In this case, the drive system of the present invention does not provide any traction control, and both motors receive flow in essentially the same amount. With the wheels turning at the same rate, there is essentially the same pressure differential across each motors, and the hydraulic circuits are balanced. The signal line pressures are applied evenly to the directional valves 61' and 61", the valves are thereby each moved by their respective springs to a closed position. There is no flow through the directional control valves or the check valves. Flow is directed primarily from the A1 port 46' directly to the motor 15', which rotates the motor and hence the wheel 97. The flow then leaves the motor and is directed to B port 48', where it is applied via line 101 directly to B port 48" of circuit 99. The flow is then directed through motor 15" to rotate wheel 96. The flow then leaves the motor and is directed through A1 port 46" to outlet line 102 and back to the source. There is no flow along line 103 (connecting A2 port 52" and C port 50') or line 104 (connecting C port 50" and A2 port 52') interconnecting the motors.

Thus, as should be appreciated, both hydraulic motors receive the same flow through the hydraulic circuits, and the wheels are thereby rotated at the same speed. The system is balanced.

Figure 11:
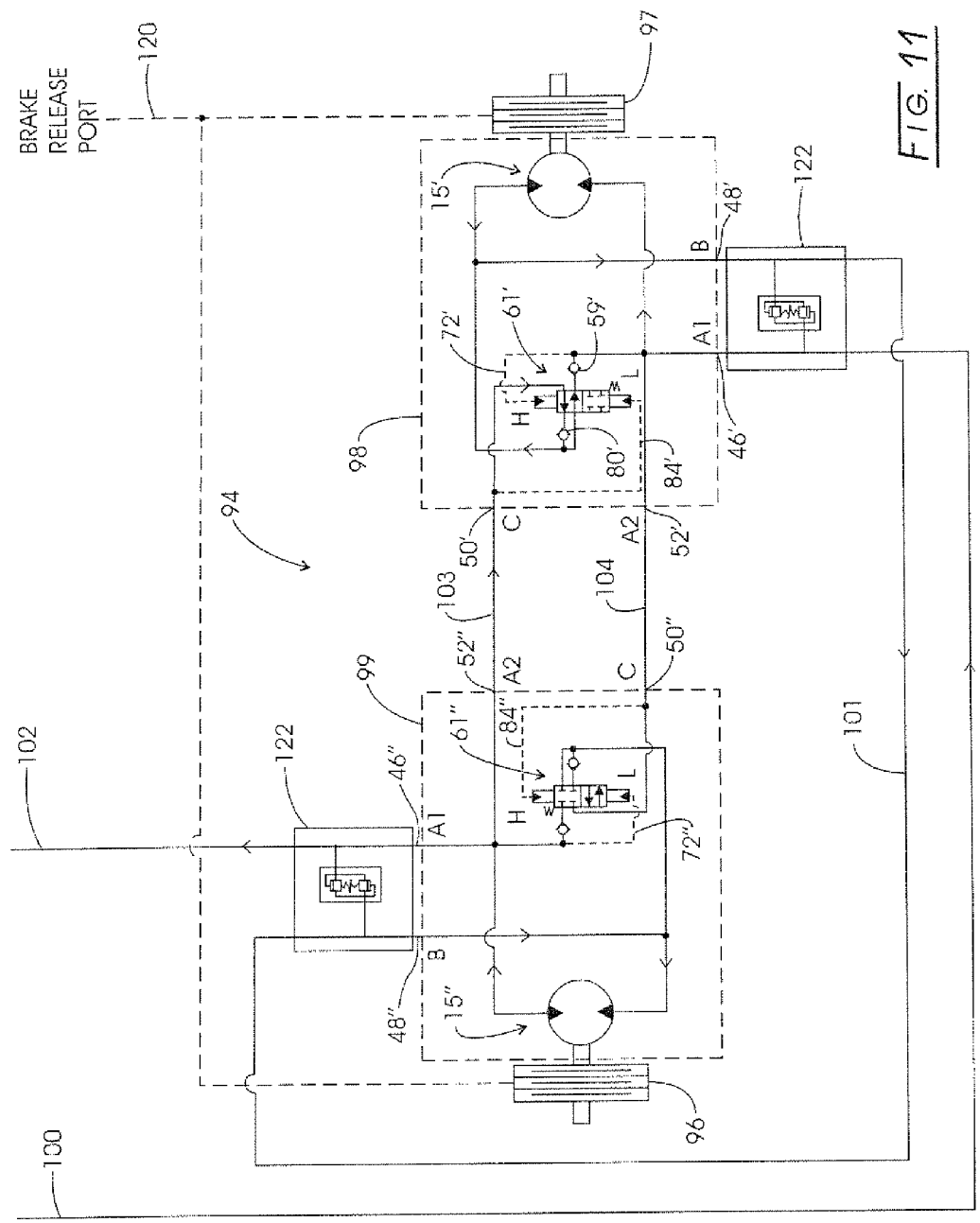
FIG. 11 is a schematic view of the hydraulic drive system, illustrating the hydraulic drive system operating under a right turn, forward, uphill, positive load condition.

Referring now to FIG. 11, a condition is illustrated where the vehicle is traveling uphill, with a positive load, and the vehicle is turning right, that is, the wheel 97 is rotating slower than wheel 96, due to the turn differential of the vehicle. In this case, wheel 97, the slower turning wheel, is the "driven" wheel; while wheel 96, the faster driven wheel, is "freewheeling". A pressure differential develops across motor 15' of hydraulic circuit 98 (a higher pressure on the upstream side of the motor), which causes a pressure differential between the signal lines 72', 84' applied to directional control valve 61', which at a predetermined pressure is sufficient to shift this valve against its spring bias to an open position, and to allow fluid to circulate from hydraulic circuit 99 back to hydraulic circuit 98 (via line 103 and through check valve 80'), and thereby increase the flow via line 101 to motor 15" in hydraulic circuit 99. A pressure differential also develops across directional control valve 61" in circuit 99 via lines 72'" and 84", but it is applied in conjunction with the spring bias to keep this valve closed. In this condition, flow will be seen from A2 port 52" to C port 50' across line 103, and through check valve 80' to be applied with flow from motor 15' to B port 48' and across line 101 to motor 15" through B port 48". No flow will occur through check valve 59' because of the higher pressure on the upstream side of this valve. Since directional control valve 61" is closed, no flow will occur through the check valves in circuit 99, or across line 104. Outlet flow is then directed through A1 port 46" via line 102 back to source (at low pressure). With the fluid recirculating back to motor 15" through directional control valve 61', motor 15" will have higher flow and hence rotate faster than motor 15'.

Figure 12:
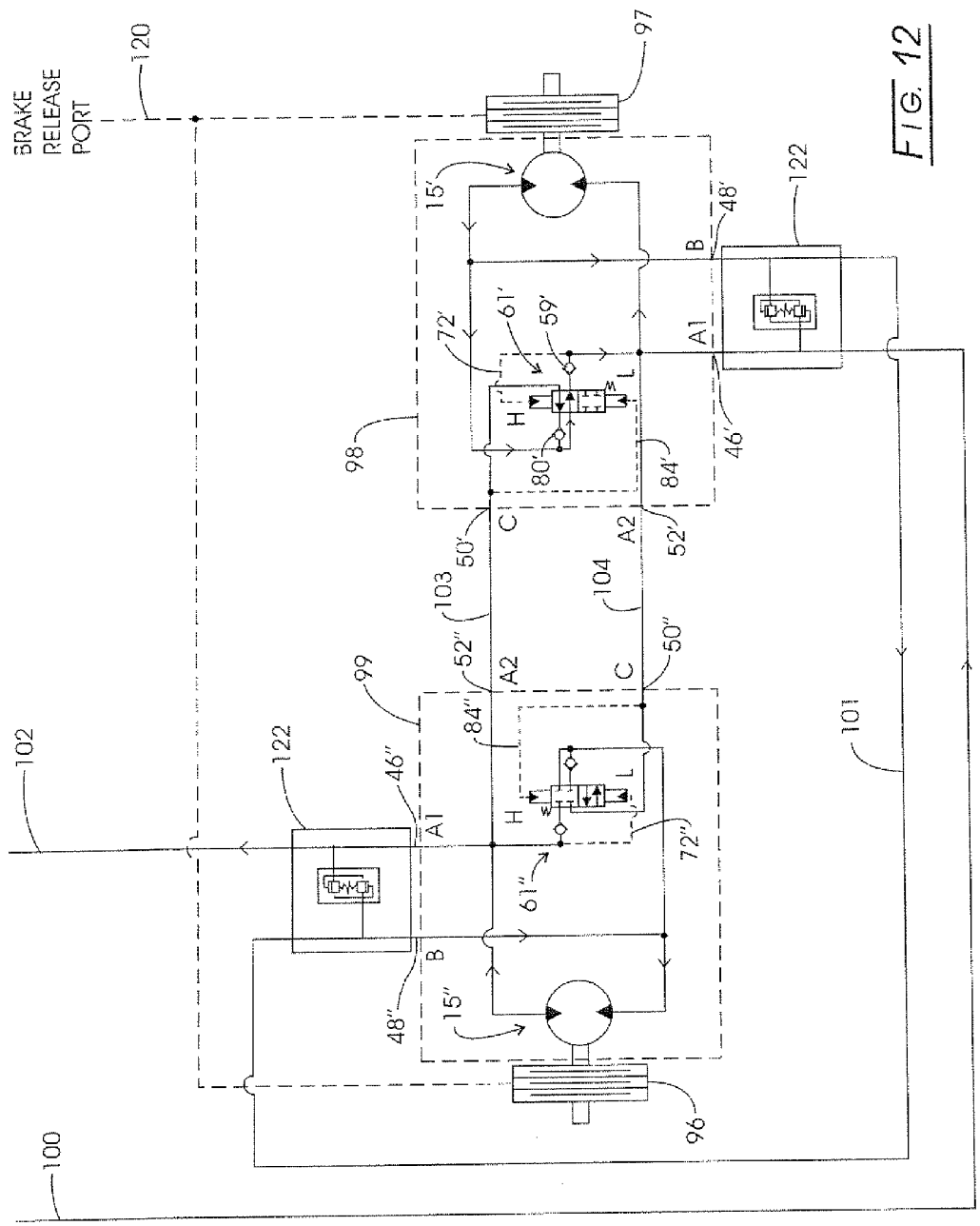
FIG. 12 is a schematic view of the hydraulic drive system, illustrating the hydraulic drive system operating under a right turn, forward, downhill, negative load condition.

Referring now to FIG. 12, a condition is illustrated similar to FIG. 11 (uphill, positive load), but where the vehicle is turning left. In this case, wheel 97 is the faster, freewheeling wheel; while wheel 96 is the slower, driven wheel. A pressure differential develops across motor 15" (but not across motor 15'), which again causes directional control valve 61' to shift against its spring bias into an open position, while the directional control valve 61" remains closed. The lower pressure signal applied to line 84' in circuit 98 is caused by motor 15" in this situation, rather than motor 15'. Signal lines 72' and 84" remain at high pressure; while a low pressure signal is received along line 72". A portion of the outlet flow from motor 15' is applied along line 101 through B port 48" in circuit 99 to motor 15"; while a portion is also directed through check valve 59' and directional control valve 61' and (re)combines with flow received in A1 port 46' to be directed to motor 15'. Check valve 80' is held shut by the higher pressure from motor 15', and there is therefore no flow via line 103 between A2 port 52" and C port 50'. Likewise, with directional control valve 61" closed, there is no flow along line 104 between C port 50" and A2 port 52'. With a portion of the flow being recirculated back through directional control valve 61' to motor 15', motor 15' thereby receives higher flow and rotates faster than motor 15". Outlet flow from motor 15" is again directed through A1 port 46" via line 102 back to source (at low pressure).

In either the FIG. 11 (right turn) or FIG. 12 (left turn) conditions, if the driven wheel loses traction, flow will automatically be directed to the freewheeling wheel, as either check valve 59' or check valve 80' will open to direct the flow to the freewheeling wheel, which will then become the "driven wheel" until the other wheel regains traction. If an inside wheel looses traction, the outside wheel speed (and the vehicle speed) will decrease to the speed that the main pump can provide to the outside wheel.

Figure 13:
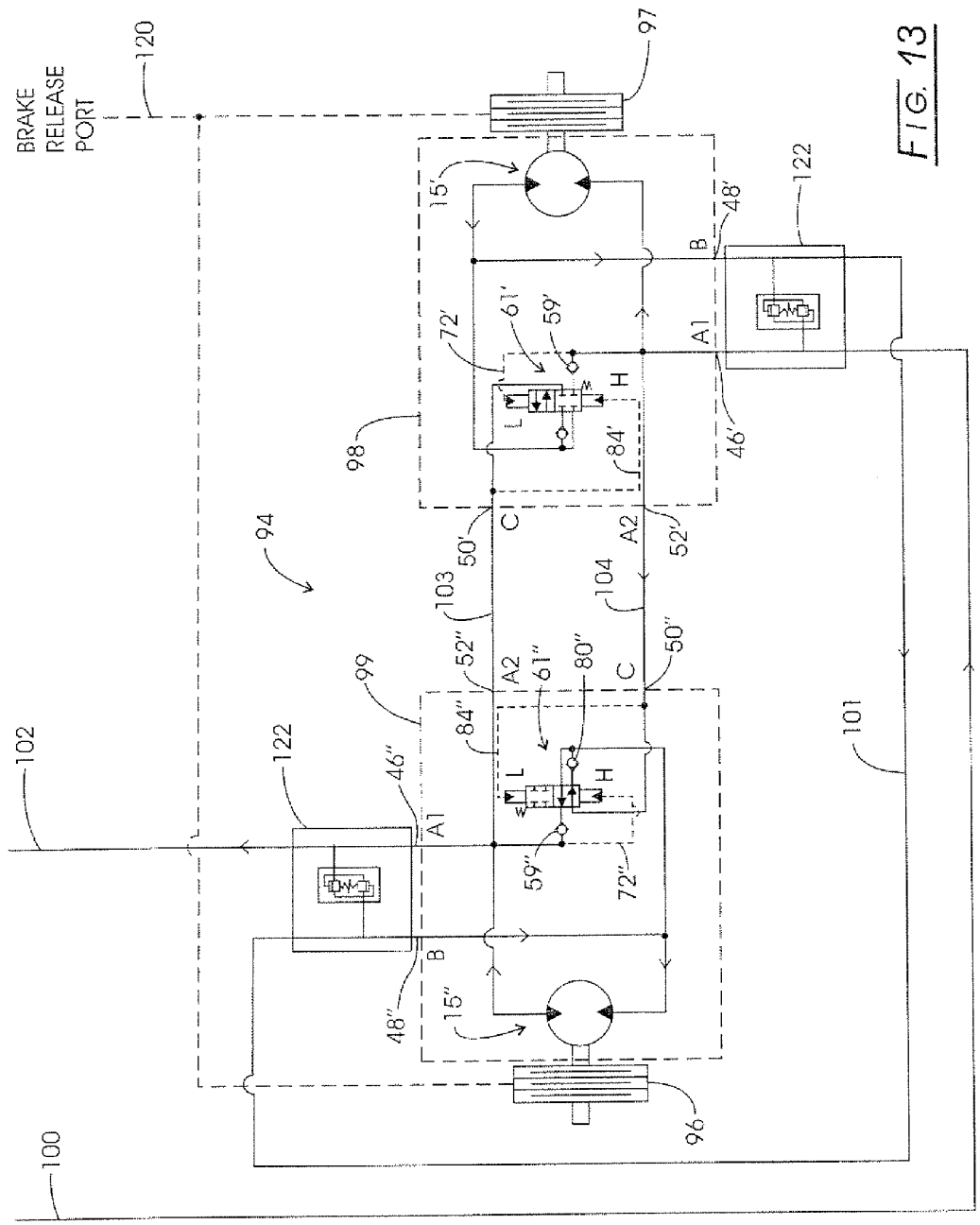
FIG. 13 is a schematic view of the hydraulic drive system, illustrating the hydraulic drive system operating under a left turn, forward, uphill, positive load condition.

Referring now to FIG. 13, a condition is illustrated where the vehicle is traveling downhill, with a negative load, and the vehicle is turning right, that is, the wheel 97 is the slower, freely-turning wheel, and wheel 96 is the faster, retarding wheel. A pressure differential develops across motor 15" of hydraulic circuit 99 (higher pressure on the downstream side of the motor), which causes a pressure differential between the signal lines 72" and 84" applied to directional control valve 61", which in conjunction with the spring bias, moves this valve open, to allow fluid to circulate from hydraulic circuit 98 back to hydraulic circuit 99 (via line 104, A2 port 52', C port 50" and check valve 80"), which combines with flow received through B port 48" to increase the flow to motor 15" in hydraulic circuit 99. On the other side, there is no pressure differential on the signal lines 72' 84' to directional control valve 61' (motor 15' is freewheeling), so the spring in this valve moves it into a closed position. In this condition, a flow will be seen from A2 port 52' to C port 50" across line 104, and through check valve 80" to be applied with flow from motor 15' via B port 48' and across line 101 to motor 15" through B port 48". No flow will occur through check valve 59" because of the higher pressure on the upstream side of this valve. Since directional control valve 61' is closed, no flow will occur through the check valves in circuit 98. Outlet flow is then directed through port 46" via line 102 back to source (at high pressure). Since a portion of the flow received in A1 port 46' is being tapped off through line 104 to motor 15", motor 15" will receive higher flow and hence rotate faster than motor 15'.

Figure 14:
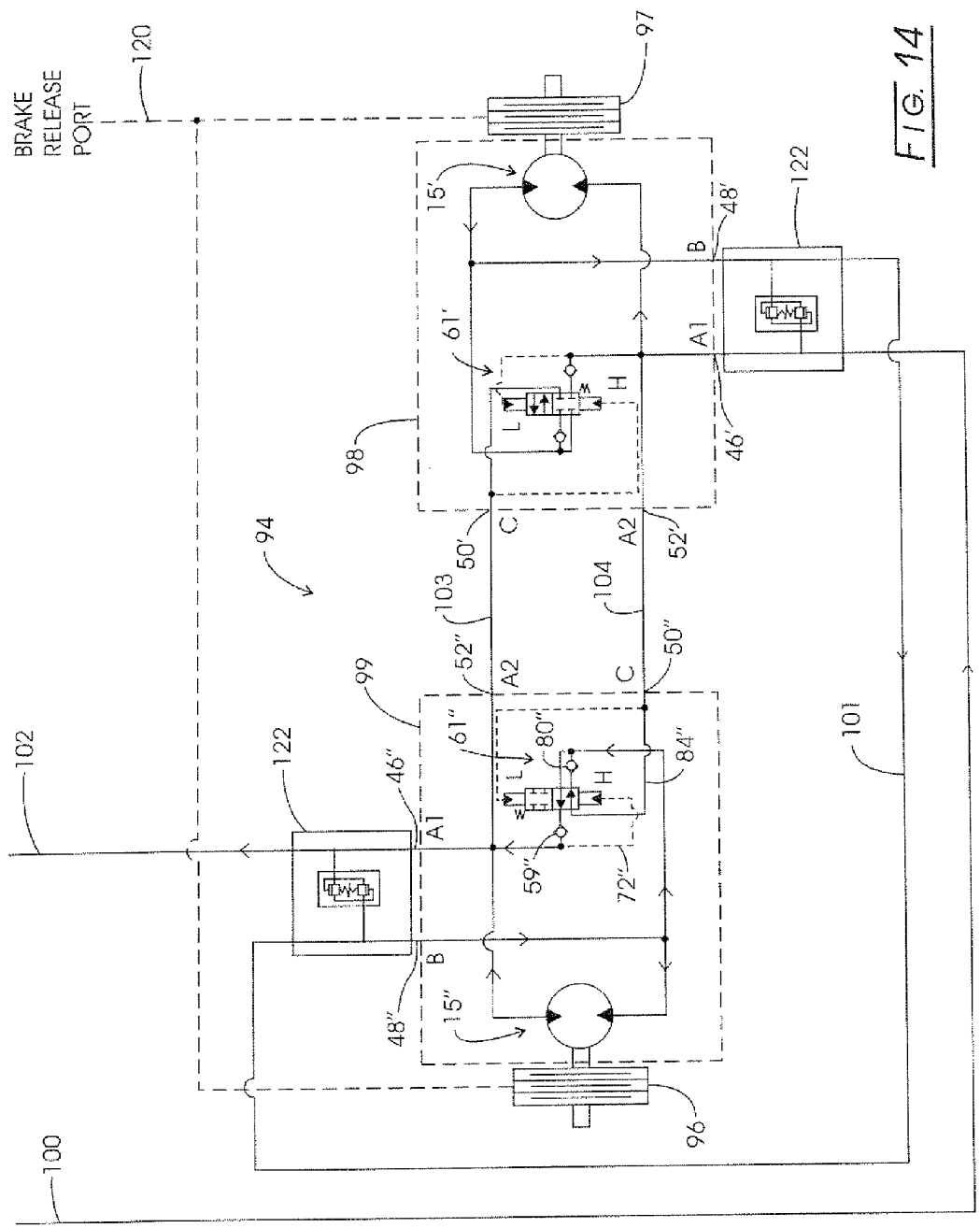
FIG. 14 is a schematic view of a hydraulic drive system, illustrating the hydraulic drive system operating under a left turn, forward, downhill, negative load condition.

Finally, referring now to FIG. 14, a condition is illustrated similar to FIG. 13 (downhill, negative load), but where the vehicle is turning left. In this case, wheel 97 is the faster, retarding wheel; while wheel 96 is the slower, freely-turning wheel. A pressure differential develops across motor 15' (but not across motor 15"), which again causes directional control valve 61" to open, and directional control valve 61' to remain closed. The higher pressure signal applied to line 72" in circuit 99 is caused by motor 15' in this situation, rather than motor 15". The entire flow passes from A1 port 46' through motor 15', where it is then applied via B port 48' and line 101 to B port 48" in circuit 99. A portion of the flow passes through motor 15", while a portion is directed through directional control valve 61" and through check valve 59", to combine with the output flow from motor 15" and pass to A1 port 46" to the source (at high pressure). Check valve 80" remains closed because of the higher pressure on the upstream side of this valve. Since a portion of the flow to motor 15" is being tapped off through directional control valve 61", motor 15" will see less flow and rotate slower than motor 15'.

Likewise, in either the FIG. 13 (right turn) or FIG. 14 (left turn) conditions, if the driven wheel loses traction, flow will automatically be directed to the freewheeling wheel, and check valve 59" or check valve 80" will control the flow to the freewheeling wheel, which will then become the "driven wheel" until the other wheel regains traction. If an outside wheel looses traction, the inside wheel speed (and the vehicle speed) will increase to the speed that the main pump can provide to the inside wheel.

To reiterate, for driving purposes, while accelerating and/or climbing uphill, the required torque is transmitted by the flow and pressure passing through the motor turning the wheel on the inside turning radius, while the outside motor is allowed to turn freely and faster by re-circulating the required flow to compensate for the different turning radius of the vehicle.

This process reverses when the vehicle is going downhill and/or decelerating, and the motors are braking. The required torque is then transmitted by the flow and pressure passing through the motor turning the wheel on the outside turning radius, while the motor turning the wheel on the inside turning radius is allowed to turn freely and slower by re-circulating the required flow to compensate for the different turning radius of the vehicle. If a drive wheel loses traction, the flow and pressure is automatically shifted to the other wheel and/or both wheels, until traction is regained.

The same flow is provided to both motors and the pressure is divided evenly by the motors when the vehicle is traveling in a straight line.

The motors are sized appropriately to the particular application, and it is preferred that each individually be able to handle the flow rates sufficient to propel the machine.

A conventional brake release path 120 is typically provided for each wheel.

To protect against excessive pressures in the drive system, such as if the tractive effort capability (torque) of any given wheel is lower than the torque required to produce wheel slip, cross-port relief valves 122 can be provided to relieve pressure from the high pressure zone to the low pressure zone. This should be well-known to those skilled in the art.

Thus, as described above, a hydraulic drive circuit is provided which compensates for different load conditions and directions of the vehicle. A further advantage of the present invention is that any leakage across the first motor is available for use in the inlet of the second motor.

While a pair of hydraulic circuits are shown for the hydraulic drive system, it is noted that the present invention could likewise be used for controlling the flow of fluid to more than two wheels, simply by scaling the invention (i.e., adding additional hydraulic circuits in series and/or in a combination of "sets" of series and parallel configurations).

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A hydraulic drive system for a vehicle, the vehicle having a pair of turning wheels for directing the vehicle, wherein the wheels having different rates of rotation when the vehicle is turning due to the turning radius of the vehicle, the drive system comprising:

a pair of hydraulic drive motors, each of which includes i) a hydraulic drive mechanism operatively connected to a drive shaft for driving a respective wheel for moving the vehicle, ii) an inlet port and an outlet port for directing fluid to and from the drive mechanism, and iii) a hydraulic circuit fluidly communicating with the hydraulic drive mechanism and with the hydraulic circuit of the other motor, and responsive to a pressure differential across the motors to provide increased flow to the motor of a wheel having a greater rate of rotation than the other, wherein the drive motors are connected in series, with the inlet port of one motor fluidly connected to receive fluid from a fluid source, the outlet port of the one motor fluidly connected to the inlet port of the other motor for directing fluid from the one motor into the other motor, and the outlet port of the other motor fluidly connected to direct fluid from the other motor to a reservoir, wherein each hydraulic circuit includes a control valve responsive to the pressure differential across the motors enclosed within an end cover assembly of the respective motor.

2. The hydraulic drive system as in claim 1, wherein each hydraulic circuit further includes a pair of one-way check valves, such check valves controlling the flow through the control valve of the hydraulic circuit depending on the pressure differentials across the motors and the direction of fluid flow through the hydraulic circuit.

3. The hydraulic drive system as in claim 1, wherein each hydraulic drive mechanism comprises a gerotor drive mechanism.

4. The hydraulic drive system as in claim 1, wherein each hydraulic circuit includes a control device responsive to the pressure differential across the motors for controlling fluid flow in each circuit, and having high and low pressure fluid zones, incorporated within an end cover attached to the respective motor.

5. The hydraulic drive system as in claim 1, wherein the fluid reservoir is one of; the fluid source or a tank.

6. A hydraulic drive system for a vehicle, the vehicle having a pair of turning wheels for directing the vehicle, wherein the wheels having different rates of rotation when the vehicle is turning due to the turning radius of the vehicle, the drive system comprising:
  a pair of hydraulic drive motors, each of which includes i), a hydraulic drive mechanism operatively connected to a drive shaft for driving a respective wheel for moving the vehicle, ii) an inlet port and an outlet port for directing fluid to and from the drive mechanism, and iii) a hydraulic circuit fluidly communicating with the hydraulic drive mechanism and with the hydraulic circuit of the other motor, and responsive to a pressure differential across the motors to provide increased flow to the motor of a wheel having a greater rate of rotation than the other, wherein the drive motors are connected in series, with the inlet port of one motor fluidly connected to receive fluid from a fluid source, the outlet port of the one motor fluidly connected to the inlet port of the other motor for directing fluid from the one motor into the other motor, and the outlet port of the other motor fluidly connected to direct fluid from the other motor to a reservoir, wherein each hydraulic circuit includes control means responsive to the pressure differential across the motors enclosed within an end cover assembly of the respective motor.

7. A hydraulic motor for a hydraulic drive system, the hydraulic motor comprising:
  a housing enclosing a drive mechanism, and a drive shaft operatively connected to the drive mechanism and projecting exteriorly of the housing, inlet and outlet ports in the housing providing inlet and outlet fluid flows to the drive mechanism, the drive mechanism providing high and low pressure fluid flows, and the housing having an end face defining high and low pressure fluid zones in communication with the high and low pressure fluid flows, respectively; and
  an end cover fixed to the housing, the end cover enclosing a hydraulic circuit, the hydraulic circuit including a control valve in fluid communication with the high and low pressure fluid zones and with the drive mechanism, the control valve responsive to pressure differentials between the fluid zones to control the flow of fluid to the drive is mechanism.

8. The hydraulic motor as in claim 7, wherein the end cover comprises a cylindrical body with a mounting face disposed in adjacent relation to the end face of the housing, and fasteners securely fixing the end cover to the housing.

9. The hydraulic motor as in claim 7, wherein a first signal line is provided from the inlet port to the control valve, and the end cover includes an additional port to enable fluid communication with another hydraulic circuit, and a second signal line is provided from the additional port to the control valve.

10. The hydraulic motor as in claim 9, wherein the hydraulic circuit further includes a pair of check valves, such check valves controlling the flow through the control a valve of the hydraulic circuit depending on the pressure differentials across the motors and the direction of fluid flow through the hydraulic circuit.

11. A hydraulic drive system for a vehicle, the vehicle having a pair of turning wheels for directing the vehicle, wherein the wheels having different rates of rotation when the vehicle is turning due to the turning radius of the vehicle, the drive system comprising:
  a pair of hydraulic drive motors, each of which includes i) a hydraulic drive mechanism operatively connected to a drive shaft for driving a respective wheel for moving the vehicle, ii) an inlet port and an outlet port for directing fluid to and from the drive mechanism, and iii) a hydraulic circuit fluidly communicating with the hydraulic drive mechanism and with the hydraulic circuit of the other motor, and responsive to a pressure differential across the motors to provide increased flow to the motor of a wheel having a greater rate of rotation than the other, wherein the drive motors are connected in series, with the inlet port of one motor fluidly connected to receive fluid from a fluid source, the outlet port of the one motor fluidly connected to the inlet port of the other motor for directing fluid from the one motor into the other motor, and the outlet port of the other motor fluidly connected to direct fluid from the other motor to a reservoir, and further including a housing enclosing the drive mechanism of each motor, the drive mechanism providing high and low pressure fluid flows in the respective motor, and the housing for each motor having an end face defining high and low pressure fluid zones in communication with the high and low pressure fluid flows, respectively; and an end cover fixed to the housing, the end cover enclosing the hydraulic circuit within the motor, the hydraulic circuit including a control valve in fluid communication with the high and low pressure fluid zones and with the drive mechanism, the control valve responsive to pressure differentials between the fluid zones to control the flow of fluid to the drive mechanism.

\* \* \* \* \*

UNITED STATES PATENT AND TRADEMARK OFFICE
CERTIFICATE OF CORRECTION

PATENT NO. : 7,100,732 B2  Page 1 of 1
APPLICATION NO. : 10/640521
DATED : September 5, 2006
INVENTOR(S) : Larry E. Feldcamp and Brad P. Shupe It is certified that error appears in the above-identified patent and that said Letters Patent is hereby corrected as shown below:

Title page, item 75, change "Inventor: Larry E. Feldcamp, Callendar (CA)" to
--Inventor: Larry E. Feldcamp, Callendar (CA); Brad P. Shupe, Greeneville, Tennessee (US)--

Signed and Sealed this

Eighth Day of May, 2007

JON W. DUDAS
*Director of the United States Patent and Trademark Office*